(12) United States Patent
Kao et al.

(10) Patent No.: US 9,855,630 B2
(45) Date of Patent: Jan. 2, 2018

(54) ELECTRICITY SUPPLY TOOL HOLDER FOR MACHINING CENTER

(71) Applicant: TONGTAI MACHINE & TOOL CO.,LTD., Kaohsiung (TW)

(72) Inventors: Huai-En Kao, Kaohsiung (TW);
Chung-Kuang Lin, Kaohsiung (TW);
Jian-Tzung Ou, Kaohsiung (TW);
Hsin-Pao Chen, Kaohsiung (TW);
Jui-Hsiung Yen, Kaohsiung (TW)

(73) Assignee: Tongtai Machine & Tool Co., Ltd. (TW)

( * ) Notice: Subject to any disclaimer, the term of this patent is extended or adjusted under 35 U.S.C. 154(b) by 328 days.

(21) Appl. No.: 14/887,436

(22) Filed: Oct. 20, 2015

(65) Prior Publication Data

US 2016/0184941 A1 Jun. 30, 2016

(30) Foreign Application Priority Data

Dec. 31, 2014 (TW) ................ 103223464 U

(51) Int. Cl.
| | |
|---|---|
| *H01F 27/42* | (2006.01) |
| *H01F 37/00* | (2006.01) |
| *H01F 38/00* | (2006.01) |
| *B23Q 1/00* | (2006.01) |
| *B23B 37/00* | (2006.01) |
| *B23Q 3/157* | (2006.01) |
| *H01R 13/717* | (2006.01) |

(52) U.S. Cl.
CPC ............ *B23Q 1/0009* (2013.01); *B23B 37/00* (2013.01); *B23B 2250/16* (2013.01); *B23B 2270/022* (2013.01); *B23Q 3/157* (2013.01); *B23Q 2220/008* (2013.01); *H01R 13/7172* (2013.01)

(58) Field of Classification Search
CPC B23Q 1/0009; B23Q 3/157; B23Q 2220/008; B23B 37/00; B23B 2250/16; B23B 2270/022; H01R 13/7172
USPC ........................................... 307/104
See application file for complete search history.

(56) References Cited

U.S. PATENT DOCUMENTS

2009/0114204 A1\* 5/2009 Ohnishi ................ B23D 47/12
125/13.03

\* cited by examiner

*Primary Examiner* — Carlos Amaya
(74) *Attorney, Agent, or Firm* — Roger D. Emerson; Emerson, Thomson & Bennett, LLC

(57) ABSTRACT

An electricity supply tool holder for a machining center is provided, and has: a holder body, a stationary coil portion, a rotating coil portion, a lateral fixing portion, and an electrical machinery. The stationary coil portion is provided with a primary coil therein; the rotating coil portion is correspondingly provided with a secondary coil therein; and the lateral fixing portion is fixed on a side of the stationary coil portion used for removably combining with a machining center. When the tool holder is rotated, an external electric power/signal can be transmitted through the lateral fixing portion to the primary coil, then inducing the secondary coil, then the electric power/signal is transmitted to the electrical machinery. Additionally, the lateral fixing portion can be switched into a locked position to temporarily limit rotation, so that it can be used in a machining center of an Automatic Tool Changing (ATC) system.

13 Claims, 10 Drawing Sheets

ELECTRICITY SUPPLY TOOL HOLDER FOR MACHINING CENTER

FIELD OF THE INVENTION

The present invention relates to an electricity supply tool holder for a machining center, and more particularly to a non-contact type electricity supply tool holder used in an Automatic Tool Changing (ATC) machining center.

BACKGROUND OF THE INVENTION

A high frequency vibration cutting is a new type machining technology, and by adding a high frequency vibration into a common cutting tool, an interrupted contact is generated between a cutting tool and a workpiece, and it fundamentally changes the conventional cutting method. This change can solve the problems existing in the conventional cutting technologies, for example the vibration and the heat accumulation during a cutting process or the unstable machining quality, so that the cutting effect is improved.

In a conventional high frequency vibration technology, a high frequency vibration device is disposed inside a tool holder, which is removably mounted on a machining center. Generally, the machining center having high frequency vibration has two methods to supply electric power, a contact type and a non-contact type. Because electrodes of the contact type are more easily worn, the non-contact type electricity supply is more frequently adopted in the new type of high frequency vibration machining center.

In the conventional technology of a non-contact type electricity supply, inductive coils are adopted, wherein a stationary coil is disposed in a machining center, and a rotating coil is disposed inside a tool holder, so that it can avoid an electrode wear phenomenon of a contact type electricity supply. However, since the machining center and the tool holder should both be special specifications, the whole cost of the machining center is increased, the tool holder cannot be universally used in the other machining centers, and they cannot be used in an Automatic Tool Changing (ATC) machining center.

Hence, it is necessary to provide an electricity supply tool holder for a machining center to solve the problems existing in the conventional technologies.

SUMMARY OF THE INVENTION

The object of the present invention is to provide an electricity supply tool holder for a machining center, which comprises a stationary coil portion and a rotating coil portion. The stationary coil portion is provided with a primary coil therein; the rotating coil portion is correspondingly provided with a secondary coil therein; and the secondary coil is electrically connected with an electrical machinery inside the electricity supply tool holder. When the electricity supply tool holder is rotated, an external electric power/signal can be transmitted through the primary coil, then inducing the secondary coil, then transmitted to the electrical machinery.

Another object of the present invention is: when dismounting the electricity supply tool holder from a machining center, the lateral fixing portion is switched into a locked position by a clutch assembly to temporarily limit rotation corresponding to the holder body, so that the electricity supply tool holder can be used in a machining center with an Automatic Tool Changing (ATC) system.

For achieving above-mentioned object, the present invention provides an electricity supply tool holder for a machining center, used in the machining center having a rotating shaft, and comprises:

a holder body formed as a columnar and including a holder shank disposed on an upper end thereof and a tool chuck disposed on a lower end thereof, wherein the holder shank is used for removably combining with a holder shank chuck of an end of the rotating shaft of the machining center; and the tool chuck is used for clamping and downwardly fixing a cutting tool;

a stationary coil portion coaxially and rotatably disposed on the holder body and being provided with at least one primary coil therein;

a rotating coil portion coaxially and fixedly disposed on the holder body and being provided with at least one secondary coil therein, wherein the secondary coil corresponds to the primary coil;

a lateral fixing portion fixed on a side of the stationary coil portion and used for removably combining with a fixing location of the machining center, wherein the lateral fixing portion comprises at least one set of input electrode portions, one end of which is removably and electrically connected to an electric source of the machining center, and the other end of which is electrically connected to the primary coil of the stationary coil portion by at least one set of first electric wires; and an electrical machinery disposed inside the holder body and electrically connected to the secondary coil of the rotating coil portion by at least one set of second electric wires;

wherein when the electricity supply tool holder is mounted on the holder shank chuck of the machining center and starts to be rotated, the machining center transmits an electric power/signal to the set of first electric wires, then to the primary coil of the stationary coil portion, and the secondary coil of the rotating coil portion is induced to generate an electric power/signal, which is then transmitted to operate the electrical machinery.

In one of the embodiments of the present invention, the electrical machinery is disposed close to the tool chuck, and the rotating coil portion is disposed under the stationary coil portion so as to be close to the electrical machinery.

In one of the embodiments of the present invention, the electricity supply tool holder further comprises a control assembly and a clutch assembly; the control assembly at least includes a control element, which is disposed inside the lateral fixing portion and switchably has a first position and a second position; the clutch assembly at least includes a clutch element and an engaged element; one end of the clutch element is disposed inside the lateral fixing portion, and the other end thereof is disposed close to the holder body; the clutch element corresponds to the control element and moves therewith, and has a locked position and an unlocked position; the engaged element is fixedly connected with the holder body; when the control element is located at the first position, the clutch element is moved therewith to the locked position, and is engaged with the engaged element on the holder body, so that the holder body cannot be rotated corresponding to the lateral fixing portion; and when the control element is switched into the second position, the clutch element is moved therewith to the unlocked position, and is separated from the engaged element on the holder body, so that the holder body can be freely rotated corresponding to the lateral fixing portion.

In one of the embodiments of the present invention, the control element is an ejector pin assembly, which is movably disposed on a bottom of the lateral fixing portion, and when the ejector pin assembly is pushed by an external push rod, the control element is switched from the first position to the second position.

In one of the embodiments of the present invention, the ejector pin assembly comprises an ejector pin and a hat-like bush; the diameter of a lower end of the hat-like bush is greater than the diameter of an upper end thereof; the hat-like bush is movably disposed on an upper end of the ejector pin, and the ejector pin and the hat-like bush are slid up and down inside the lateral fixing portion; the end close to the lateral fixing portion of the clutch element is formed as a hollow ring, which corresponds to the diameter of the upper end of the hat-like bush, so that when the ejector pin is pushed by the external push rod, the hat-like bush is moved therewith and then pushes the clutch element from the locked position to the unlocked position.

In one of the embodiments of the present invention, the clutch element has at least one convex portion, and the engaged element correspondingly has at least one concave portion, so that the clutch element is engaged with the engaged element by the convex portion of the clutch element and the concave portion of the engaged element.

In one of the embodiments of the present invention, the clutch element has at least one concave portion, and the engaged element correspondingly has at least one convex portion, so that the clutch element is engaged with the engaged element by the concave portion of the clutch element and the convex portion of the engaged element.

In one of the embodiments of the present invention, an end which is close to the holder body of the clutch element is provided with a first hollow disk which has a center circle hole passed through by the holder body, so that the first hollow disk is coaxially and rotatably disposed on the holder body; and the engaged element is correspondingly provided with a second hollow disk which has a center circle hole passed through by the holder body and is fixed thereon.

In one of the embodiments of the present invention, the first hollow disk of the clutch element has at least one convex key, and the second hollow disk of the engaged element correspondingly has at least one concave groove, so that the first hollow disk is engaged with the second hollow disk by the convex key of the clutch element and the concave groove of the engaged element.

In one of the embodiments of the present invention, the first hollow disk of the clutch element has at least one convex groove, and the second hollow disk of the engaged element correspondingly has at least one concave key, so that the first hollow disk is engaged with the second hollow disk by the convex groove of the clutch element and the concave key of the engaged element.

In one of the embodiments of the present invention, the clutch assembly further comprises a third hollow disk, which is disposed in an opposite side of the first hollow disk corresponding to the second hollow disk; and the third hollow disk is fixed with the lateral fixing portion, and is used to assist the first hollow disk being engaged with the second hollow disk by an up and down clamping method.

In one of the embodiments of the present invention, the electrical machinery is a high frequency vibration module, so that the cutting tool under the electricity supply tool holder generates a high frequency vibration when in a cutting operation.

In one of the embodiments of the present invention, the electrical machinery is a sensing module or a wireless signal module.

As described above, the electricity supply tool holder for the machining center according to the present invention can not only avoid an electrode wear phenomenon of a contact type electricity supply, but can also be used in a conventional machining center, to be further used in a machining center with an ATC system.

DETAILED DESCRIPTION OF THE PREFERRED EMBODIMENTS

Figure 1:
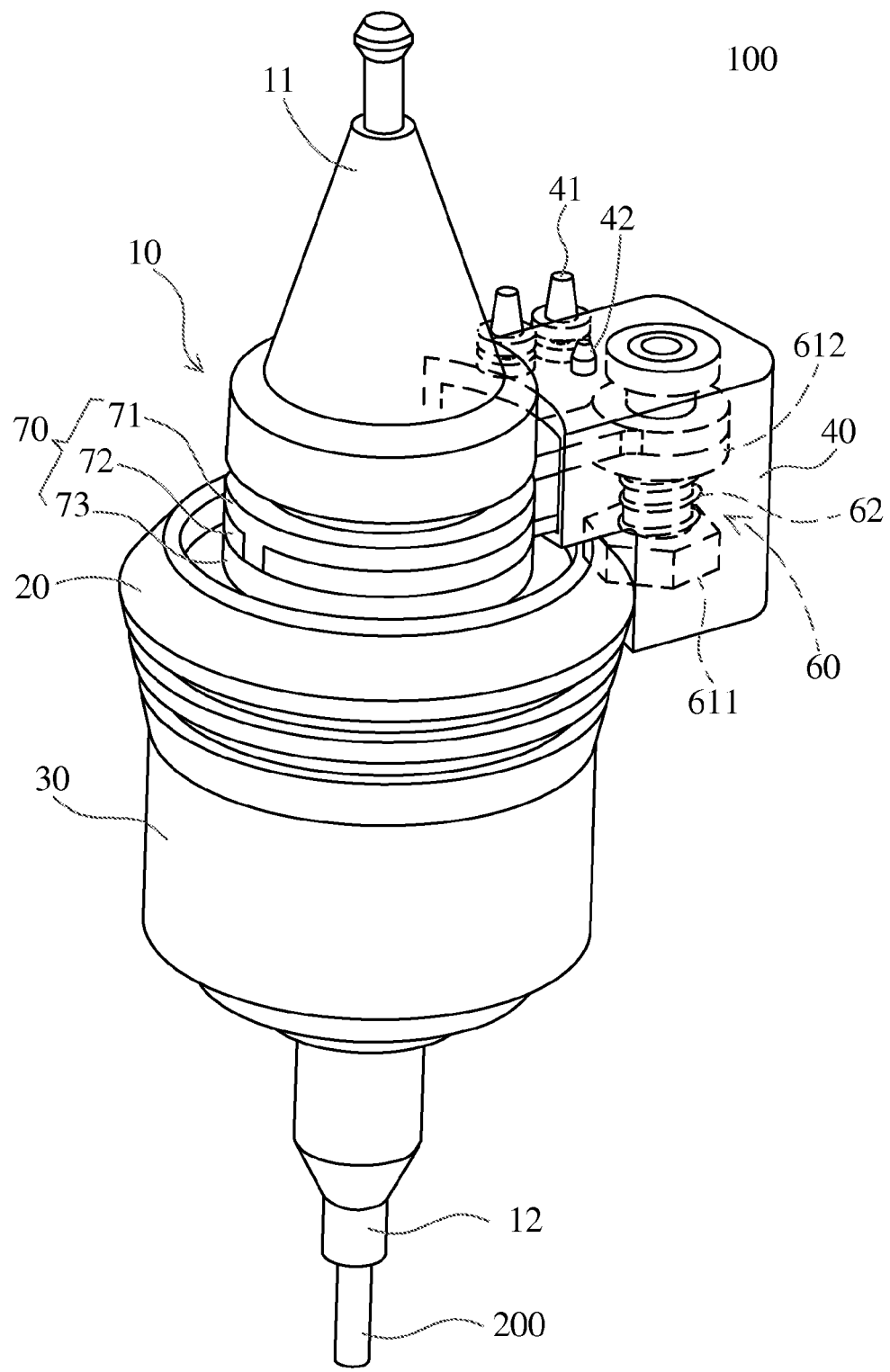
FIG. 1 is a perspective view of an electricity supply tool holder according to a preferred embodiment of the present invention.

The foregoing objects, features, and advantages adopted by the present invention can be best understood by referring to the following detailed description of the preferred embodiments and the accompanying drawings. Furthermore, the directional terms described in the present invention, such as upper, lower, front, rear, left, right, inner, outer, side, etc., are only directions with reference to the accompanying drawings, so that the used directional terms are used to describe and understand the present invention, but the present invention is not limited thereto. In the drawings, units with similar structures use the same numerals.

Figure 2:
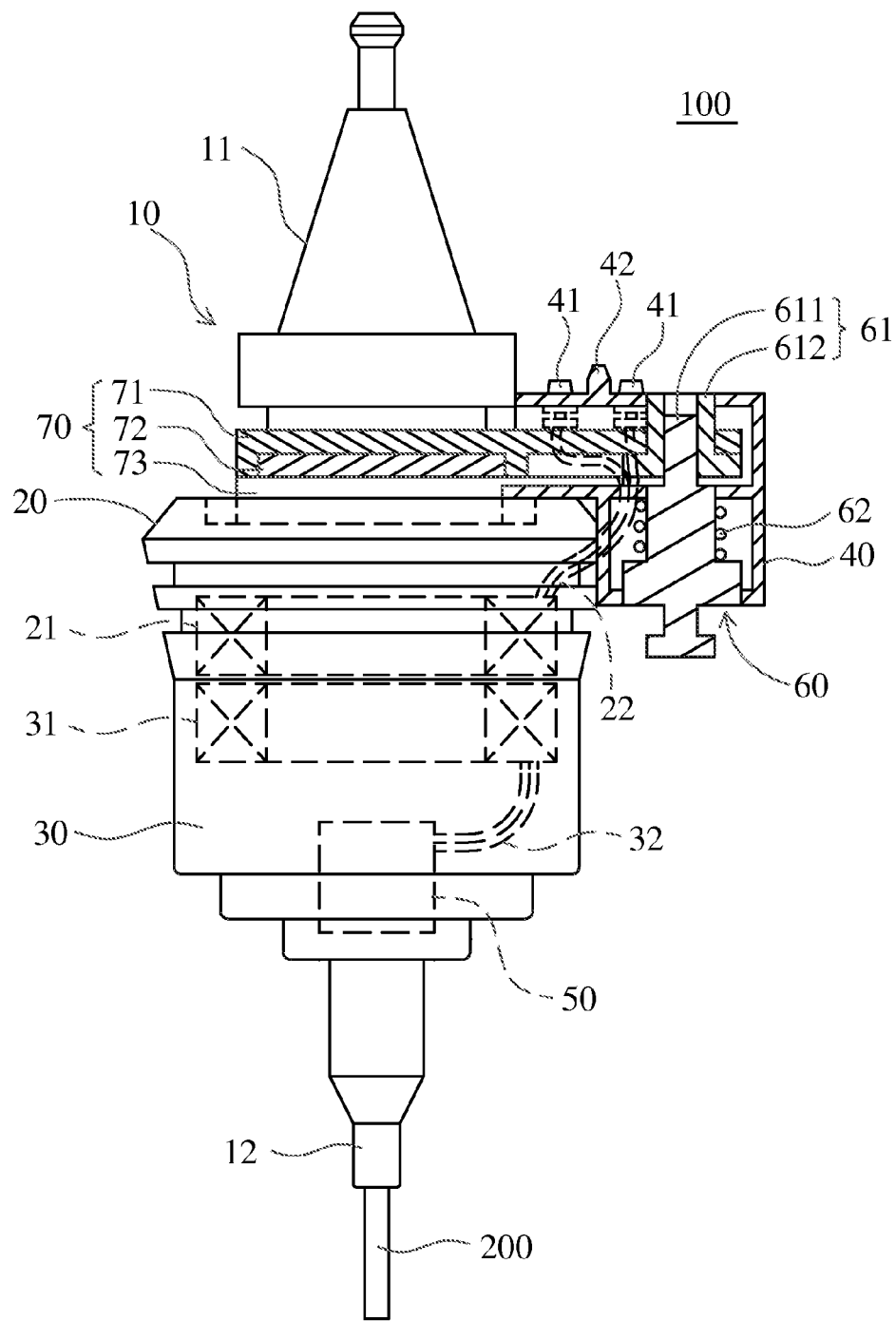
FIG. 2 is a side view of the electricity supply tool holder according to the preferred embodiment of the present invention.

An electricity supply tool holder for the present invention is used in a machining center, and more particularly in a machining center having a rotating shaft. Refer now to FIGS. 1 and 2, FIG. 1 is a perspective view of an electricity supply tool holder according to a preferred embodiment of the present invention, and FIG. 2 is a side view of the electricity supply tool holder according to the preferred embodiment of the present invention. For clearly showing certain internal structures, some of the elements in FIG. 2 are shown using a cross-sectional method.

As shown in FIGS. 1 and 2, an electricity supply tool holder 100 of a machining center according to the present invention comprises: a holder body 10, a stationary coil portion 20, a rotating coil portion 30, a lateral fixing portion 40, and a electrical machinery 50 (e.g. a high frequency vibration module). The holder body 10 is formed as a columnar, and includes a holder shank 11 and a tool chuck 12, wherein the holder shank 11 is disposed on an upper end of the holder body 10, and is used for removably combining with a machining center (not shown); and the tool chuck 12 is disposed on a lower end of the holder body 10, and is used for clamping and downwardly fixing a cutting tool 200. The stationary coil portion 20 is coaxially and rotatably disposed on the holder body 10, and is provided with at least one primary coil 21 therein; and the rotating coil portion 30 is coaxially and fixedly disposed on the holder body 10, and is provided with at least one secondary coil 31 therein, wherein the secondary coil 31 corresponds to the primary coil 21.

Furthermore, the lateral fixing portion 40 is fixed on a side of the stationary coil portion 20, and is used for removably combining with a fixing location (not shown) of the machining center. The lateral fixing portion 40 comprises at least one set of input electrode portions 41, which is used to electrically connect to an electric source provided by the machining center. The set of input electrode portions 41 is inwardly electrically connected to the primary coil 21 of the stationary coil portion 20 by at least one set of first electric wires 22. The electrical machinery 50 (high frequency vibration module) is disposed inside the holder body 10, and is electrically connected to the secondary coil 31 of the rotating coil portion 30 by at least one set of second electric wires 32.

Additionally, the electrical machinery 50 (high frequency vibration module) must be provided an electric power for operation from an outside of the electricity supply tool holder 100. When the electricity supply tool holder 100 is mounted on the machining center and starts to be rotated, an electric power/signal can be transmitted to the set of input electrode portions 41, then to the primary coil 21 of the stationary coil portion 20 by the first electric wires 22, and the secondary coil 31 of the rotating coil portion 30 is induced to generate an electric power/signal, then the electric power/signal is transmitted to operate the electrical machinery 50 (high frequency vibration module) by the second electric wires 32, so as to support a machining operation with high frequency vibration.

In the present invention, except for the high frequency vibration module, the electrical machinery 50 also can be any other type of electrical machineries, which is disposed inside the holder body 10 and needs an external electric power. For example, a sensing module or a wireless signal module. Thus, the specific form of the electrical machinery 50 is not limited in the present invention. By the electricity supply tool holder 100 of the preferred embodiment, the electrical machinery 50 can obtain the electric power/signal that they need.

Preferably, the electrical machinery 50 is disposed close to the tool chuck 12 under the electricity supply tool holder 100. Therefore, in the embodiment, the rotating coil portion 30 is disposed under the stationary coil portion 20, so that the rotating coil portion 30 is closer the electrical machinery 50. However, the specific locations of the stationary coil portion 20, the rotating coil portion 30, and the electrical machinery 50 are not limited in the present invention; they can be designed according to user's requirements.

Preferably, a waterproof quick connector can be adopted as the input electrode portions 41, so as to be conveniently electrically connected to the electric power supplied by the machining center. Furthermore, the top of the lateral fixing portion 40 can be provided with a locating pin 42, and the locating hole (not shown) is correspondingly disposed on the machining center. When the electricity supply tool holder 100 is mounted on the machining center, by combining the locating pin 42 and the locating hole, the lateral fixing portion 40 can be temporarily combining with a fixing location of the machining center. In another possible embodiment of the present invention, the input electrode portions 41 and the locating pin 42 are possibly integrated in one single element, which achieves the position and electric power connection between the lateral fixing portion 40 and the machining center.

Refer now to FIGS. 1-2 and 3A-3B, FIGS. 3A-3B are schematic operation views of a clutch assembly of the electricity supply tool holder according to the preferred embodiment of the present invention. For clearly expressing a correlation between elements of the clutch assembly, the distances between the elements are shown in a schematic way; other connecting elements are omitted.

AS shown in FIGS. 1 and 2, the electricity supply tool holder 100 further comprises a control assembly 60 and a clutch assembly 70, and the control assembly 60 at least includes a control element 61. In the embodiment, the control element 61 can be an ejector pin assembly 61. The ejector pin assembly 61 is movably disposed on the bottom of the lateral fixing portion 40, and switchably has a first position (down) and a second position (up). The clutch assembly 70 at least includes a clutch element 71 and an engaged element 72, wherein one end of the clutch element 71 is disposed inside the lateral fixing portion 40, and the other end of the clutch element 71 is disposed close to the holder body 10; the clutch element 71 corresponds to the control element 61 (the ejector pin assembly 61) and moves therewith, and has a locked position and an unlocked position; and the engaged element 72 is fixedly connected with the holder body 10.

Figure 3A:
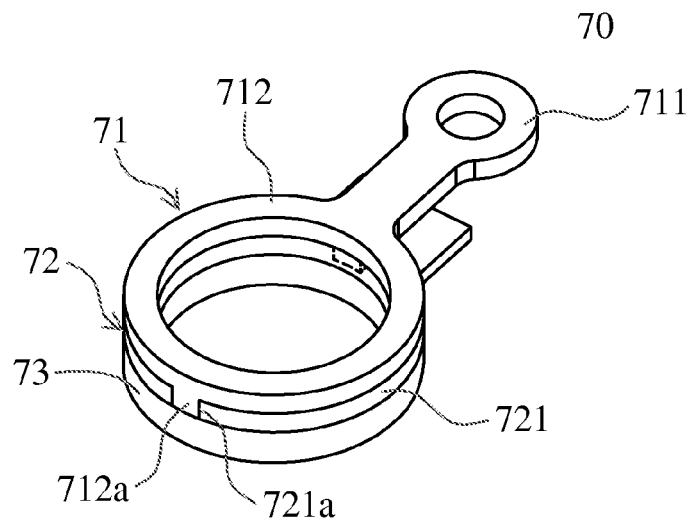
FIGS. 3A-3B are schematic operation views of a clutch assembly of the electricity supply tool holder according to the preferred embodiment of the present invention.
Figure 3B:
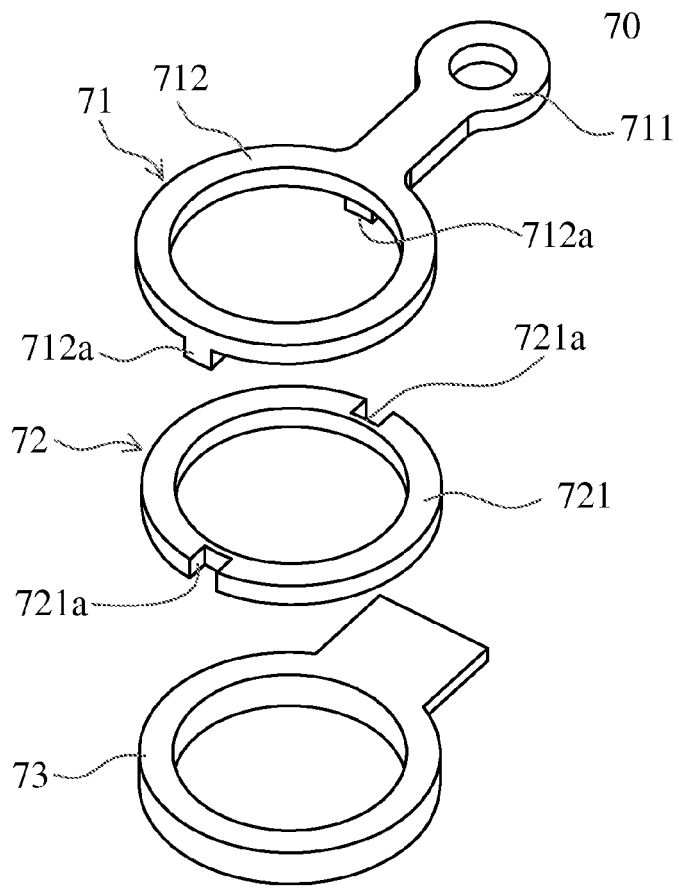

Specifically, in the embodiment, the ejector pin assembly 61 comprises an ejector pin 611 and a hat-like bush 612 arranged up and down, wherein the diameter of a lower end of the hat-like bush 612 is greater than the diameter of an upper end thereof; the hat-like bush 612 is movably disposed on an upper end of the ejector pin 611, and the ejector pin 611 and the hat-like bush 612 are slid up and down inside the lateral fixing portion 40, and have a first position (down) and a second position (up); and the end of the clutch element 71 close to the lateral fixing portion 40 is formed as a hollow ring 711 (as shown in FIGS. 3A-3B), which corresponds to the diameter of the upper end of the hat-like bush 612, and is assembled therewith.

As shown in FIGS. 3A-3B, an end of the clutch element 71 which is close to the holder body 10 is provided with a first hollow disk 712, which has a center circle hole passed through by the holder body 10, so that the first hollow disk 712 is coaxially and rotatably disposed on the holder body 10; the engaged element 72 comprises a second hollow disk 721, which corresponds to the first hollow disk 712, and has a center circle hole passed through by the holder body 10; and the second hollow disk 721 is fixed on the holder body 10 and can be rotated therewith.

Furthermore, the first hollow disk 712 of the clutch element 71 has at least one convex key 712*a* (there are two of the convex keys 712*a* symmetrically arranged in the figures), and the second hollow disk 721 of the engaged element 72 correspondingly has at least one concave groove 721*a* (there are two of the convex keys 712*a* symmetrically arranged in the figures). When the clutch element 71 is in the locked position, by the convex key 712*a* of the clutch element 71 and the concave groove 721*a* of the engaged element 72, the first hollow disk 712 of the clutch element 71 is engaged with the second hollow disk 721 of the engaged element 72. Because the second hollow disk 721 is fixed with the holder body 10, the lateral fixing portion 40 cannot be rotated corresponding to the holder body 10, so it is in a locked situation (as shown in FIG. 3A).

Therefore, when the ejector pin 611 is pushed by an external power, the ejector pin 611 pushes the hat-like bush 612, then pushes the hollow ring 711 of the clutch element 71, so as to raise the clutch element 71 from the locked position (down position) to the unlocked position (up position). At the same time, the first hollow disk 712 of the clutch element 71 is separated from the second hollow disk 721 of the engaged element 72 (as shown in FIG. 3B). Although the second hollow disk 721 is fixed on the holder body 10, the lateral fixing portion 40 can be rotated corresponding to the holder body 10 because the first hollow disk 712 is separated from the second hollow disk 721, so it is in a unlocked situation.

Preferably, the clutch assembly 70 further comprises a third hollow disk 73, which is disposed on an opposite side of the first hollow disk 712 corresponding to the second hollow disk 721; and the third hollow disk 73 is fixed with the lateral fixing portion 40, and is rotatably corresponding to the holder body 10, the same as the first hollow disk 712. When the first hollow disk 712 is engaged with the second hollow disk 721, the third hollow disk 73 is used to assist the engagement by an up and down clamping method.

As shown in FIGS. 1 and 2, the control assembly 60 further comprises at least one spring 62. In the embodiment, on end of the spring 62 is fixed on an inner wall of the lateral fixing portion 40, and the other end thereof is linked with the ejector pin 611, so as to provide a restoring force required by the ejector pin 611. In the other possible embodiments of the present invention, the spring 62 can be an extension spring or a compression spring, and can also be disposed in the other locations to assist the control assembly 60 switching between the first position and the second position.

Additionally, in the other possible embodiments of the present invention, the convex key 712a of the clutch element 71 and the concave groove 721a of the engaged element 72 can be interchanged. That is, the clutch element 71 has at least a concave groove and the engaged element 72 has at least a convex key. Besides, the number of the convex keys and the concave grooves are designed according to the user's requirements.

Furthermore, the engaging method or directions between the clutch element 71 and the holder body 10 are not limited in the present invention, and detail structures and linking methods are also designed according to the user's requirements. For example, the engaging method can be a frictional engagement or a point engagement; and the engaging directions can be in vertical, horizontal, or inside-outside directions. However, if the frictional engagement is adopted, for example a disk brake or a drum brake of vehicle wheels, the positioning effect and precision may be poor. Additionally, when the point engagement is adopted, the clutch element can include at least one convex portion and the engaged element can correspondingly include at least one concave portion, or the clutch element can include at least one concave portion and the engaged element can correspondingly include at least one convex portion, so that the engagement is achieved by disposing the convex portion and the concave portion on the clutch element and the engaged element of the clutch assembly.

As described above, the machining center of the present invention is, for example, an NC (Numerical Control) or CNC (Computer Numerical Control) machining center. The electricity supply tool holder 100 of the present invention can be mounted to the machining center by manual operation. In another way, because the electricity supply tool holder 100 can be accurately rotated to a certain angle and stopped, the electricity supply tool holder 100 can be further used in a machining center having an ATC (Automatic Tool Changing) system. If the electricity supply tool holder 100 has been mounted, it should be switched into the unlocked position, so that the holder body 10 can be rotated corresponding to the lateral fixing portion 40; if the electricity supply tool holder 100 is going to be dismounted, it should be switched into the locked position, so that the holder body 10 cannot be rotated corresponding to the lateral fixing portion 40; and therefore the electricity supply tool holder 100 is suitable for used in the ATC machining center.

Refer now to FIGS. 4A-4D, FIGS. 4A-4D are schematic operation views of the electricity supply tool holder according to the preferred embodiment of the present invention showing the electricity supply tool holder mounted on a machining center.

Figure 4A:
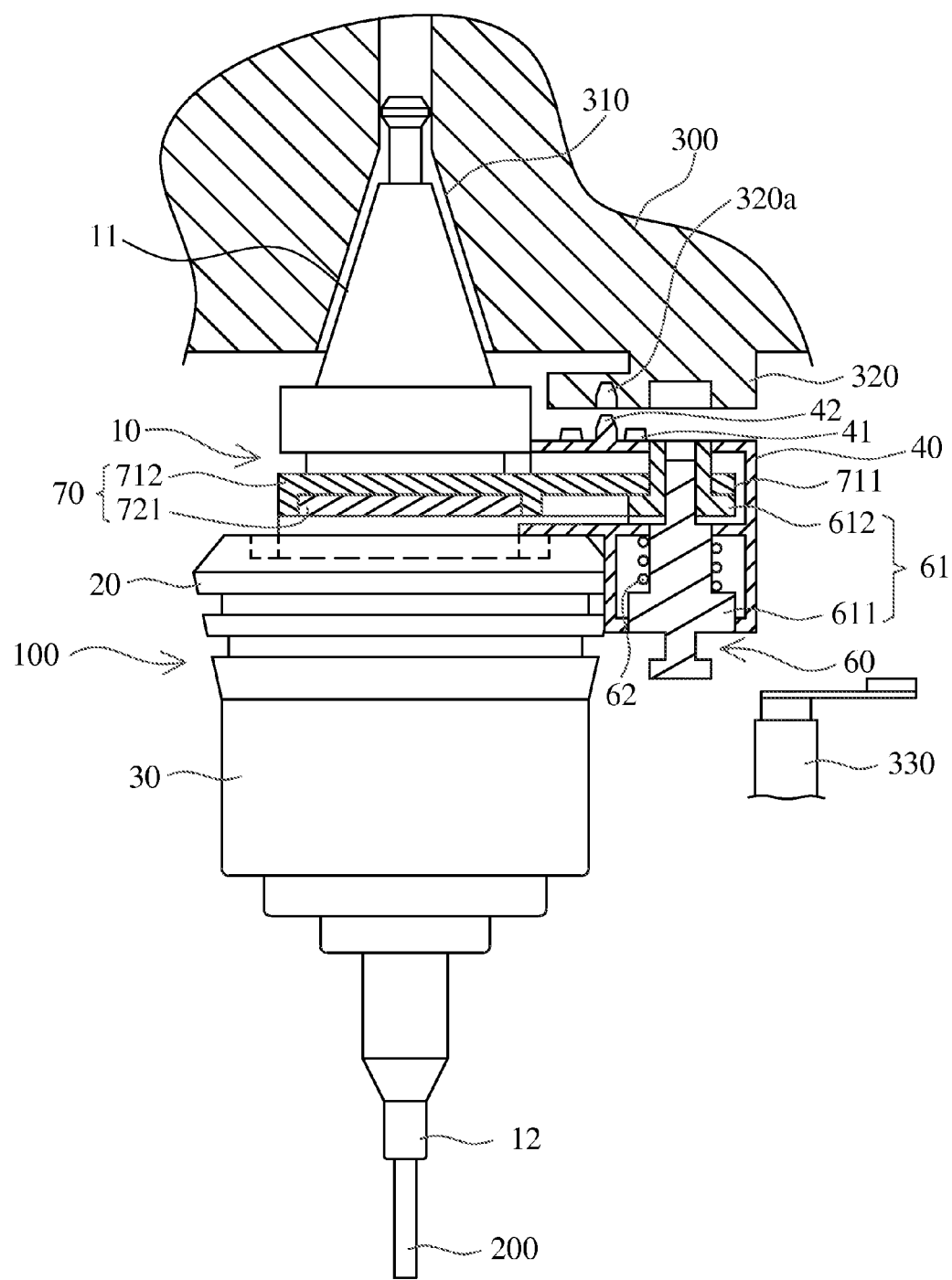
FIGS. 4A-4D are schematic operation views of the electricity supply tool holder according to the preferred embodiment of the present invention showing the electricity supply tool holder mounted on a machining center.

Firstly, as shown in FIG. 4A, the electricity supply tool holder 100 of the present invention is preset in the locked position. That is, the clutch element 71 and the engaged element 72 are engaged together, and the lateral fixing portion 40 cannot be rotated corresponding to the holder body 10. Then, the holder body 10 is aligned under a holder shank chuck 310 of a machining center 300, and the lateral fixing portion 40 is aligned under a fixing location 320 of the machining center 300.

Figure 4B:
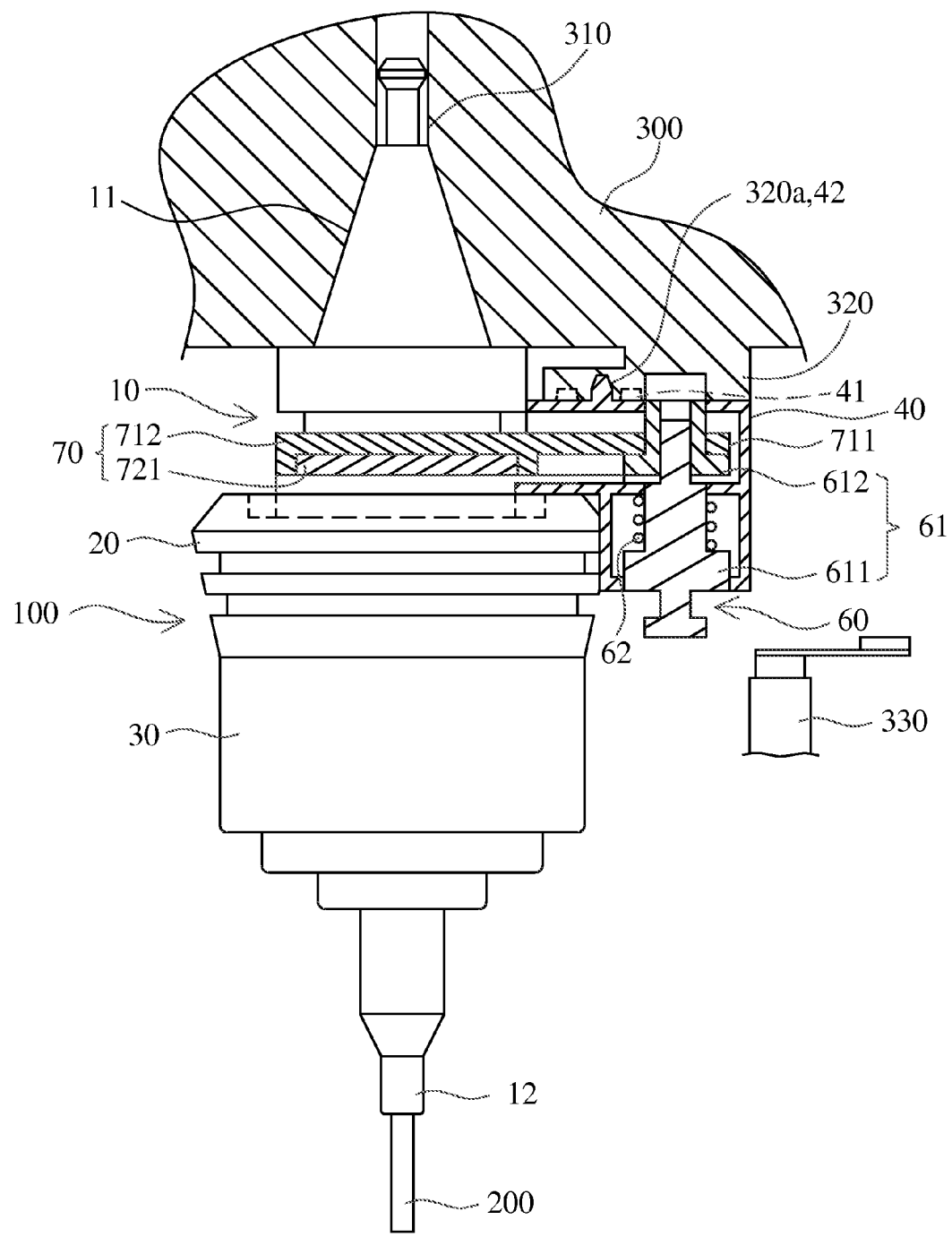

Next, as shown in FIG. 4B, the holder body 10 is raised, and the holder shank 11 of the electricity supply tool holder 100 is fixed with the holder shank chuck 310 of the machining center 300. At the same time, the lateral fixing portion 40 is adjoined to the fixing location 320 of the machining center 300, and the locating pin 42 of a top surface of the lateral fixing portion 40 is combining with the locating hole 320a of the fixing location 320, so that the lateral fixing portion 40 is temporarily located in the fixing location 320 of the machining center 300, and is electrically connected to an electric power supplied by the machining center 300 by at least one set of the input electrode portions 41.

Figure 4C:
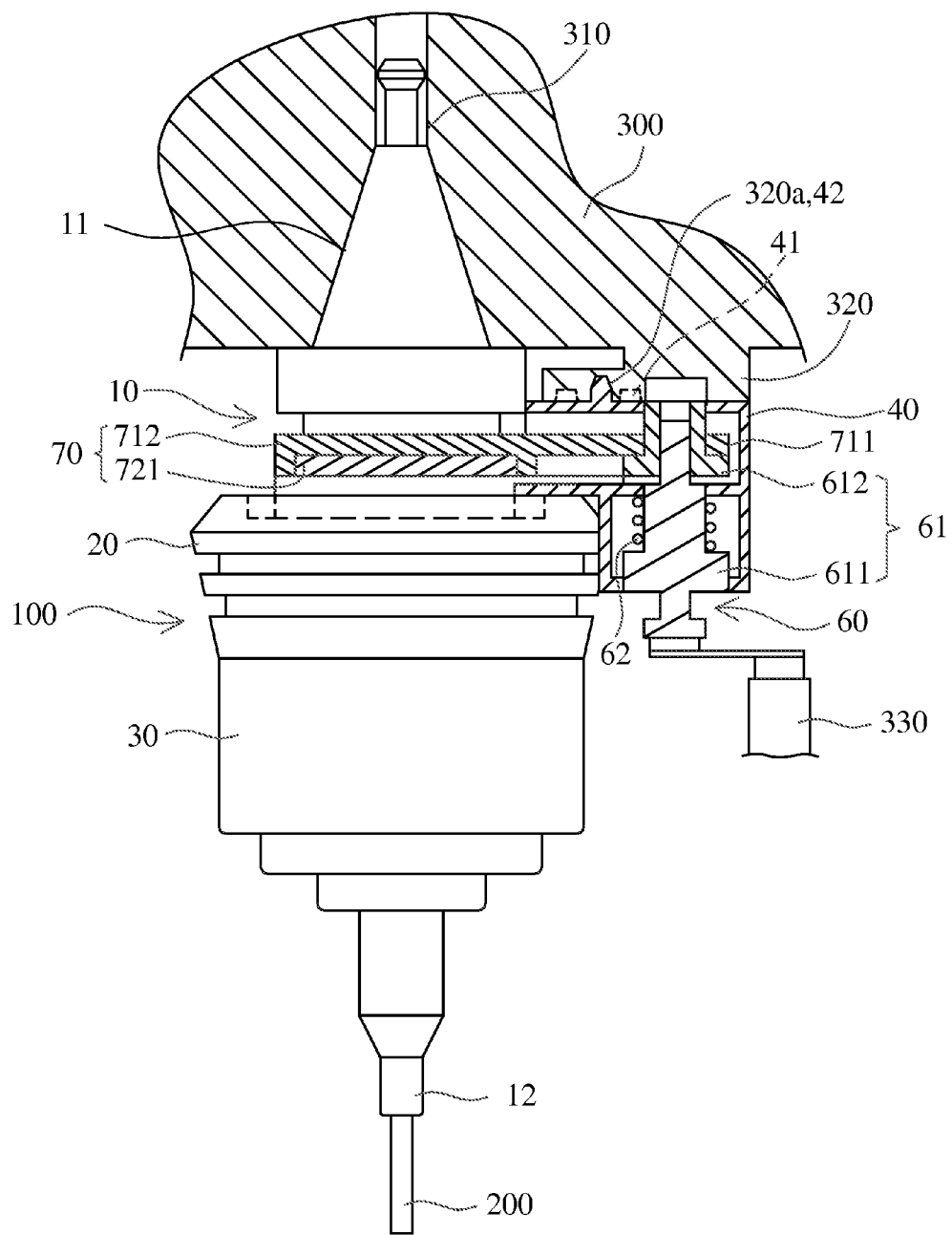

Next, as shown in FIG. 4C, move an external push rod 330 under the clutch assembly 60, and the clutch assembly 60 is now at the first position, meaning the clutch assembly 70 is located in the locked position.

Figure 4D:
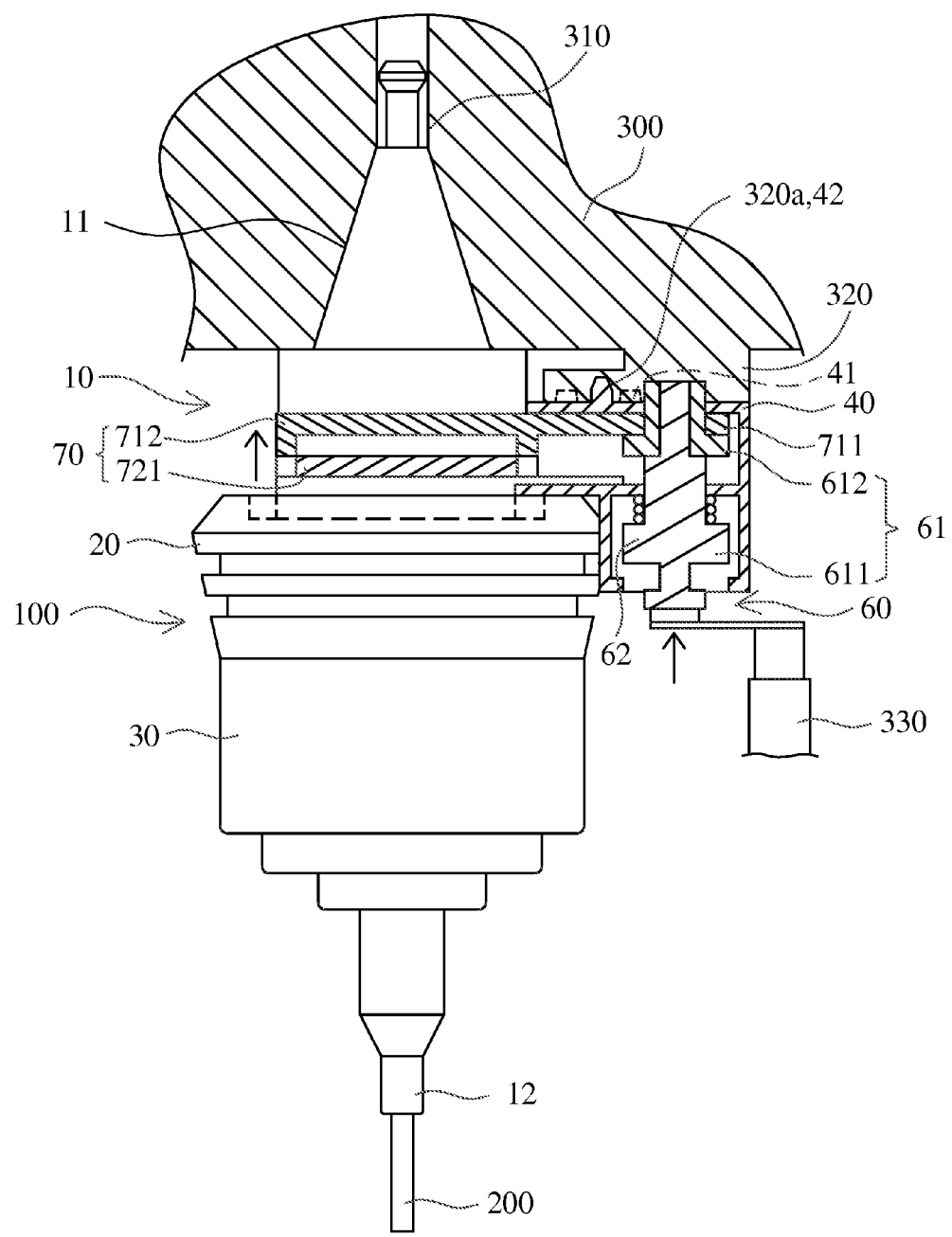

Finally, as shown in FIG. 4D, when the clutch assembly 60 is pushed upward by an external push rod 330 (shown as an upward arrow in the figure), the ejector pin 611 and the hat-like bush 612 of the clutch assembly 60 are pushed therewith, and the clutch assembly 70 is pushed to the unlocked position. Now, the first hollow disk 712 is separated from the second hollow disk 721 (shown as the upward arrow in the figure), the holder body 10 can be freely rotated corresponding to the lateral fixing portion 40, so that the operation of mounting the electricity supply tool holder 100 on the machining center 300 is finished.

Figure 5A:
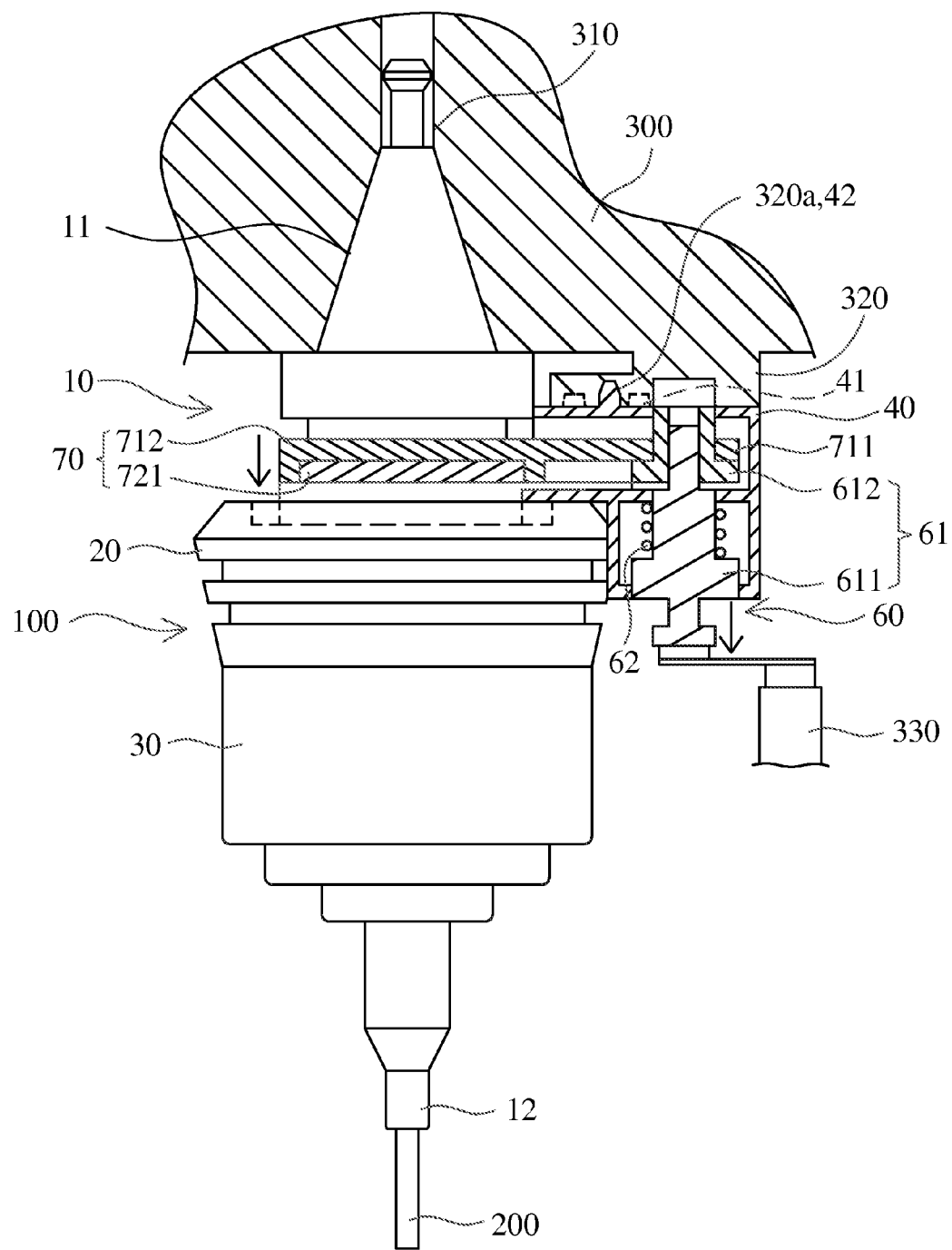
FIGS. 5A-5C are schematic operation views of the electricity supply tool holder according to the preferred embodiment of the present invention showing the electricity supply tool holder dismounted from the machining center.
Figure 5B:
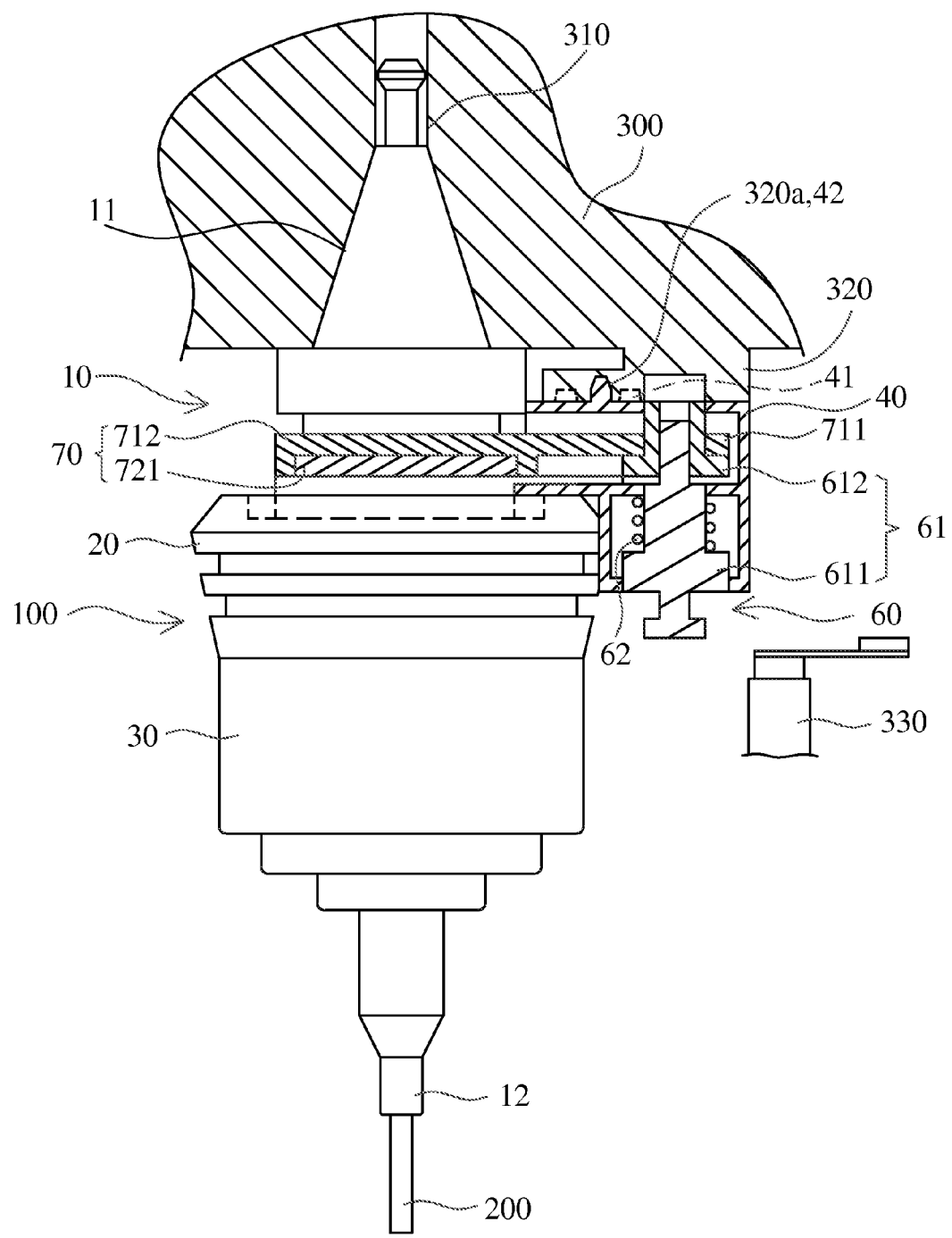
Figure 5C:
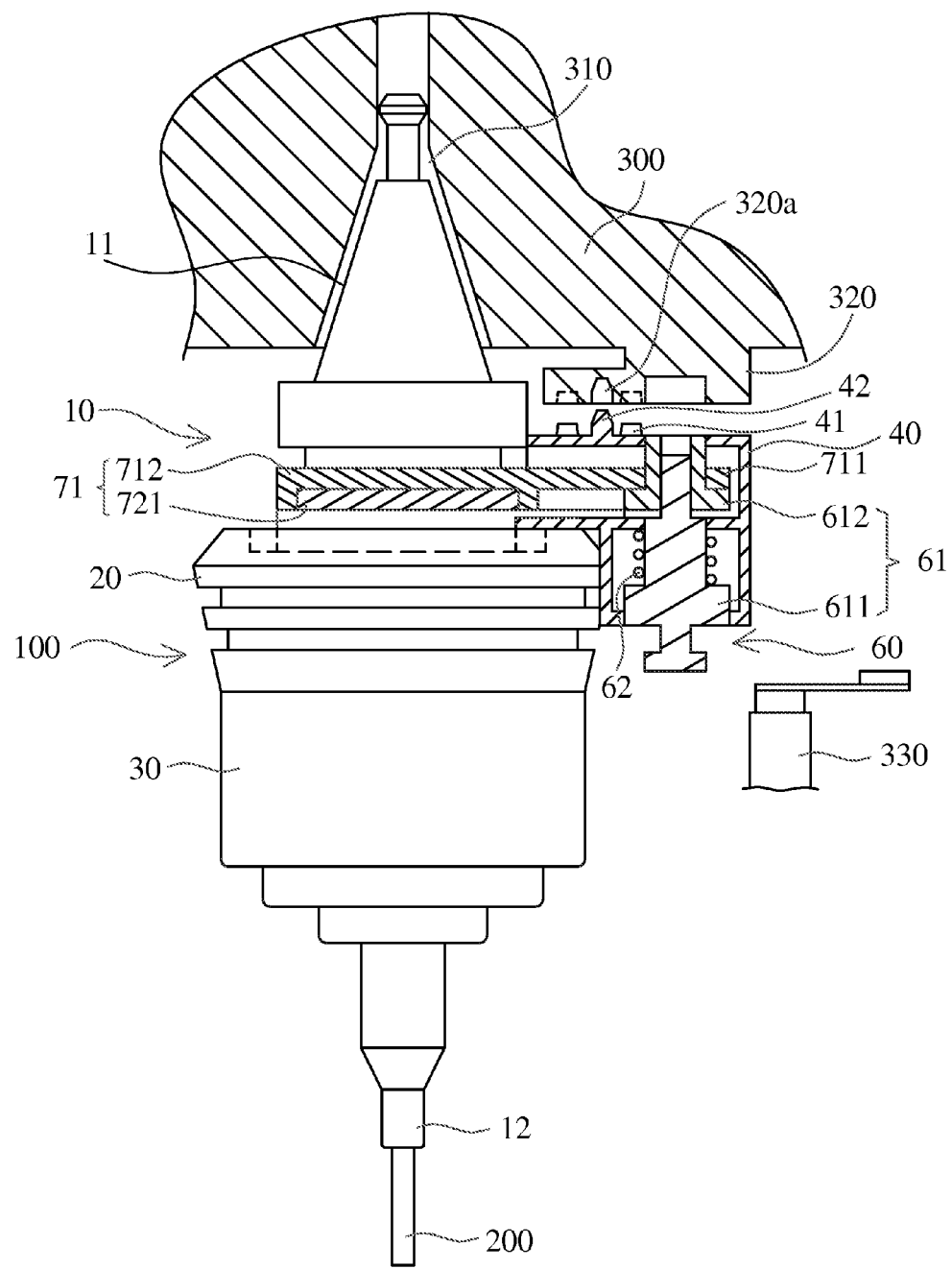

Refer now to FIGS. 5A-5C, 5A-5C are schematic operation views of the electricity supply tool holder according to the preferred embodiment of the present invention showing the electricity supply tool holder dismounted from the machining center. Before dismounting the electricity supply tool holder 100 from the machining center 300, as shown in FIG. 4D, the electricity supply tool holder 100 has been set in the unlocked position. That is, the first hollow disk 712 is separated from the second hollow disk 721 by pushing the external push rod 330 upward, and the lateral fixing portion 40 can be rotated corresponding to the holder body 10. When dismounting the electricity supply tool holder 100 from the machining center 300, firstly, the machining center 300 controls the electricity supply tool holder 100 to be rotated to a location where the convex key 712a of the first hollow disk 712 corresponds to the concave groove 721a of the second hollow disk 721 (as shown in FIG. 3B); next, the external push rod 330 is downwardly withdraw from the clutch assembly 60 (shown as a downward arrow in the figure), and the first hollow disk 712 and the second hollow disk 721 are into the locked position. That is, the convex key 712a of the first hollow disk 712 is engaged with the concave groove 721a of the second hollow disk 721 (shown as the downward arrow in the figure, and as shown in FIG. 3A), and the lateral fixing portion 40 cannot be rotated corresponding to the holder body 10.

Next, as shown in FIG. 5B, remove the external push rod 330.

Finally, as shown in FIG. 5C, dismount the electricity supply tool holder 100 from the holder shank chuck 310 of the machining center 300, so that the operation of dismounting the electricity supply tool holder 100 from the machining center 300 is finished.

As described above, an electricity supply tool holder 100 of a machining center 300 according to the present invention is provided, which comprises: a holder body 10, a stationary coil portion 20, a rotating coil portion 30, a lateral fixing portion 40, and an electrical machinery 50. The stationary coil portion 20 is provided with at least one primary coil 21 therein; the rotating coil portion 30 is correspondingly provided with at least one secondary coil 31 therein; and the secondary coil 31 is electronically connected with the electrical machinery 50. The lateral fixing portion 40 is fixed on a side of the stationary coil portion 20, and is used for removably combining with a fixing location 320 of the machining center 300. When the electricity supply tool holder 100 is mounted on the machining center 300 and starts to be rotated, the stationary coil portion 20 is fixed corresponding to the machining center 300, and an electric power/signal can be transmitted through the lateral fixing portion 40 to the primary coil 21, then inducing the secondary coil 31, then the electric power/signal is transmitted to the electrical machinery 50, so that a non-contact type electricity supply is achieved, which can avoid an electrode wear phenomenon of a contact type electricity supply. Additionally, when dismounting the electricity supply tool holder 100 from the machining center 300, the lateral fixing portion 40 is switched into a locked position by a clutch assembly 70 to temporarily limited rotation corresponding to the holder body 10, so that the electricity supply tool holder 100 can not only be used in a conventional machining center, but also can be used in a machining center with an ATC system.

The present invention has been described with preferred embodiments thereof and it is understood that many changes and modifications to the described embodiment can be carried out without departing from the scope and the spirit of the invention that is intended to be limited only by the appended claims.

The invention claimed is:

1. An electricity supply tool holder for a machining center, used in the machining center having a rotating shaft, and comprising:
   a holder body formed as a column and including a holder shank disposed on an upper end thereof and a tool chuck disposed on a lower end thereof, wherein the holder shank is used for removably combining with a holder shank chuck of an end of the rotating shaft of the machining center; and the tool chuck is used for clamping and downwardly fixing a cutting tool;
   a stationary coil portion coaxially and rotatably disposed on the holder body and being provided with at least one primary coil therein;
   a rotating coil portion coaxially and fixedly disposed on the holder body and being provided with at least one secondary coil therein, wherein the secondary coil corresponds to the primary coil;
   a lateral fixing portion fixed on a side of the stationary coil portion and used for removably combining with a fixing location of the machining center, wherein the lateral fixing portion comprises at least one set of input electrode portions, one end of which is removably and electrically connected to an electric source of the machining center, and the other end of which is electrically connected to the primary coil of the stationary coil portion by at least one set of first electric wires; and
   an electrical machinery disposed inside the holder body and electrically connected to the secondary coil of the rotating coil portion by at least one set of second electric wires;
   wherein when the electricity supply tool holder is mounted on the holder shank chuck of the machining center and starts to be rotated, the machining center transmits an electric power/signal to the set of first electric wires, then to the primary coil of the stationary coil portion, and the secondary coil of the rotating coil portion is induced to generate an electric power/signal, then the electric power/signal is transmitted to operate the electrical machinery.

2. The electricity supply tool holder according to claim 1, wherein the electrical machinery is disposed close to the tool chuck, and the rotating coil portion is disposed under the stationary coil portion so as to be close to the electrical machinery.

3. The electricity supply tool holder according to claim 1, wherein the electricity supply tool holder further comprises a control assembly and a clutch assembly; the control assembly at least includes a control element, which is disposed inside the lateral fixing portion and switchably has a first position and a second position; the clutch assembly at least includes a clutch element and an engaged element; one end of the clutch element is disposed inside the lateral fixing portion, and the other end thereof is disposed close to the holder body; the clutch element corresponds to the control element and moves therewith, and has a locked position and an unlocked position; the engaged element is fixedly connected with the holder body; when the control element is located at the first position, the clutch element is moved therewith to the locked position, and is engaged with the engaged element on the holder body, so that the holder body cannot be rotated corresponding to the lateral fixing portion; and when the control element is switched into the second position, the clutch element is moved therewith to the unlocked position, and is separated from the engaged element on the holder body, so that the holder body can be freely rotated corresponding to the lateral fixing portion.

4. The electricity supply tool holder according to claim 3, wherein the control element is an ejector pin assembly, which is movably disposed on a bottom of the lateral fixing portion, and when the ejector pin assembly is pushed by an external push rod, the control element is switched from the first position to the second position.

5. The electricity supply tool holder according to claim 4, wherein the ejector pin assembly comprises an ejector pin and a hat-like bush; the diameter of a lower end of the hat-like bush is greater than the diameter of an upper end thereof; the hat-like bush is movably disposed on an upper end of the ejector pin, and the ejector pin and the hat-like bush are slid up and down inside the lateral fixing portion; the end of the clutch element close to the lateral fixing portion is formed as a hollow ring, which corresponds to the diameter of the upper end of the hat-like bush, so that when the ejector pin is pushed by the external push rod, the hat-like bush is moved therewith and then pushes the clutch element from the locked position to the unlocked position.

6. The electricity supply tool holder according to claim 3, wherein the clutch element has at least one convex portion, and the engaged element correspondingly has at least one concave portion, so that the clutch element is engaged with the engaged element by the convex portion of the clutch element and the concave portion of the engaged element.

7. The electricity supply tool holder according to claim 3, wherein the clutch element has at least one concave portion, and the engaged element correspondingly has at least one convex portion, so that the clutch element is engaged with the engaged element by the concave portion of the clutch element and the convex portion of the engaged element.

8. The electricity supply tool holder according to claim 3, wherein an end of the clutch element which is close to the holder body is provided with a first hollow disk, which has a center circle hole passed through by the holder body, so that the first hollow disk is coaxially and rotatably disposed on the holder body; and the engaged element is correspondingly provided with a second hollow disk, which has a center circle hole passed through by the holder body and fixed thereon.

9. The electricity supply tool holder according to claim 8, wherein the first hollow disk of the clutch element has at least one convex key, and the second hollow disk of the engaged element correspondingly has at least one concave groove, so that the first hollow disk is engaged with the second hollow disk by the convex key of the clutch element and the concave groove of the engaged element.

10. The electricity supply tool holder according to claim 8, wherein the first hollow disk of the clutch element has at least one convex groove, and the second hollow disk of the engaged element correspondingly has at least one concave key, so that the first hollow disk is engaged with the second hollow disk by the convex groove of the clutch element and the concave key of the engaged element.

11. The electricity supply tool holder according to claim 8, wherein the clutch assembly further comprises a third hollow disk, which is correspondingly disposed on an opposite side of the first hollow disk corresponding to the second hollow disk; and the third hollow disk is fixed with the lateral fixing portion, and used to assist the first hollow disk engaged with the second hollow disk by an up and down clamping method.

12. The electricity supply tool holder according to claim 1, wherein the electrical machinery is a high frequency vibration module, so that the cutting tool under the electricity supply tool holder generates a high frequency vibration when in a cutting operation.

13. The electricity supply tool holder according to claim 1, wherein the electrical machinery is a sensing module or a wireless signal module.

* * * * *